Sept. 24, 1963
D. T. BARISH
3,104,855
SWIVEL
Filed April 29, 1960
2 Sheets-Sheet 1
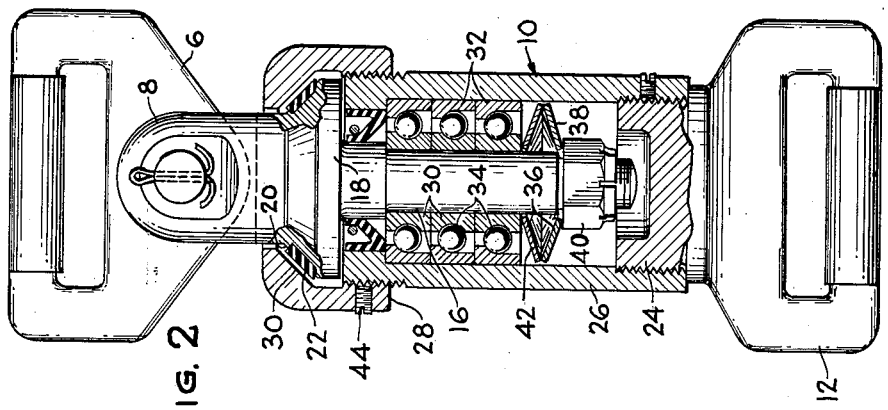
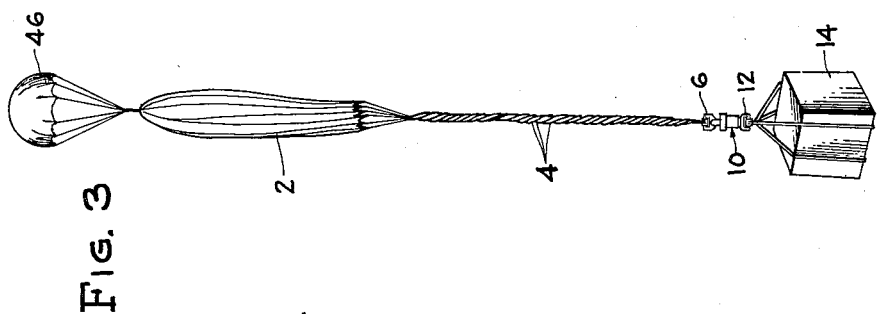
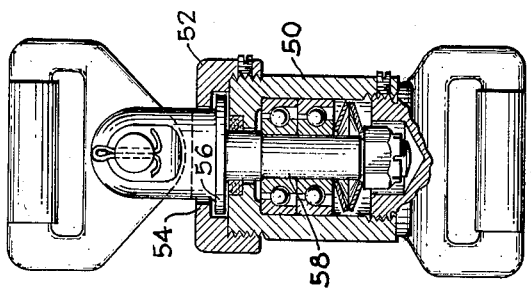
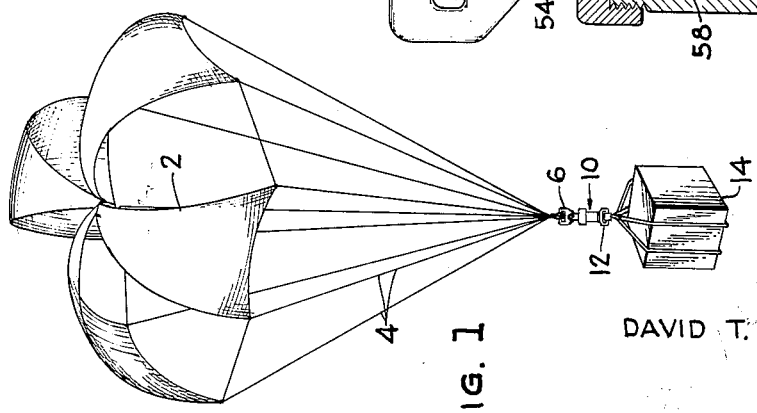
DAVID T. BARISH
INVENTOR.
BY *Albert S. Perry*
ATTORNEY Sept. 24, 1963

D. T. BARISH 3,104,855

SWIVEL

Filed April 29, 1960

DAVID T. BARISH
INVENTOR.

BY Albert Sperry

ATTORNEY

United States Patent Office 3,104,855
Patented Sept. 24, 1963

3,104,855
SWIVEL
David T. Barish, 1435 Lexington Ave., Apt. 9-D,
New York, N.Y.
Filed Apr. 29, 1960, Ser. No. 25,758
15 Claims. (Cl. 244—142)

This invention relates to swivels and is directed particularly to auto-rotating parachutes having a swivel located between the parachute and its load and to methods of using such assemblies.

Auto-rotating parachutes are constructed so that they rotate as they descend, whereas it is not usually desirable to transmit such rotation or torque to the load. It is, therefore, usual to provide a swivel connection between the parachute and load. However, the high speeds at which auto-rotating parachutes are often used renders it desirable to delay opening and rotation of the parachute canopy until the assembly has decelerated sufficiently to assure safe deployment of the canopy and proper rotation thereof. Moreover, in order to reduce the torque applied to the load to a minimum, it is desirable to provide the swivel with anti-friction bearings which might be damaged if they were to be subjected to the severe loading or the angularly directed forces frequently applied to the swivel upon initial opening of the parachute canopy.

In accordance with the present invention, these objections and limitations of swivels of the prior art are overcome and means are provided which serve to retard the opening of the parachute canopy. Further means are provided which serve to relieve the swivel bearing of undesired loading thereof. These results are preferably attained by providing the swivel with yeldable means which retard relative rotation of the swivel elements when they are subjected to improper loading serving to establish positive engagement of relatively rotatable elements to prevent undue loading of the bearings, and when such undesired loading is relieved, the bearings are freely rotatable to reduce the torque applied to the load during normal descent and rotation of the parachute.

Accordingly, it is the principal object of the present invention to provide a novel type of swivel construction which is capable of use under adverse load conditions while assuring free rotation of the elements thereof upon normal usage or limited load conditions.

A specific object of the present invention is to provide an auto-rotating parachute with swivel means which prevent or retard relative rotation of the elements thereof during the initial period of inflation or loading of the parachute canopy while permitting relatively free rotation of the parachute with respect to its loading during subsequent periods of descent.

These and other objects and features of the present invention will appear from the following description thereof wherein reference is made to the figures of the accompanying drawing.

In the drawing:

FIG. 1 is a perspective illustrating a typical form of auto-rotating parachute embodying the present invention;

FIG. 2 is a longitudinal sectional view through one form of swivel adapted for use in the assembly of FIG. 1;

FIG. 3 is a diagrammatic illustration of the assembly of FIG. 1 during the initial stages of deployment;

FIG. 4 is a longitudinal sectional view through an alternative form of swivel embodying the present invention;

Figure 6:
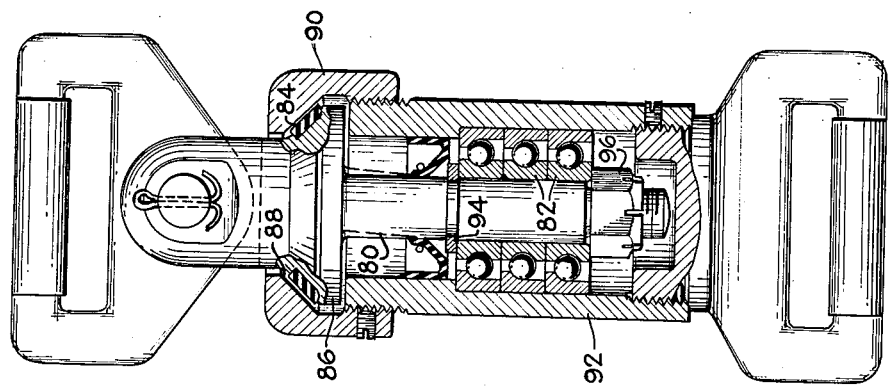
FIG. 6 is a longitudinal sectional view through a further alternative form of the invention.

In that form of the invention chosen for purposes of illustration in FIGS. 1 to 3, the auto-rotating parachute is of the type shown and described in my copending application for patent, Serial No. 684,262, filed September 16, 1957. In this assembly, the parachute canopy is indicated at 2 and is provided with shroud lines 4 which are connected to the fitting 6 secured to a clevis 8 on one end of the swivel 10. The opposite end of the swivel 10 is provided with an eye or fitting 12 to which the load 14 supported by the parachute is attached.

The parachute canopy 2 is constructed and designed to rotate during descent, whereas it is not generally desirable for the load to rotate. The swivel 10 is, therefore, provided with a shank 16 formed integral with the clevis 8 to which fitting 6 is secured for attachment to the parachute. The upper portion of shank 16 is formed with an enlarged head 18 having an outwardly inclined surface 20 provided with a fibrous or other form of braking element 22.

The lower fitting 12 of the swivel to which the load 14 is secured is provided with a threaded collar 24 to which a tubular housing 26 is secured. The upper end of the housing 26 is provided with threads to which an inwardly extending cap member 28 is applied. The cap member presents an inner inclined braking surface 30 complementary to and normally spaced from the adjacent surface of the braking element 22 carried by the shank 16.

In order to reduce the resistance to relative rotation of the shank 16 with respect to the housing 26 of the swivel under normal conditions of operation, antifriction bearings are located between the shank 16 and the housing 26. As shown, these bearings are of the angular thrust type and each embodies an inner race member 31 adjacent the shank 16 and an outer race member 32 adjacent the housing 26 while ball bearings 34 are positioned between the race members. Two or three sets of such bearings are generally employed as shown in U.S. Patent No. 2,651,533 so as to assure substantially free rotation of the shank 16 and parachute 2 with respect to the housing 26 and the load 14 under normal conditions of descent.

The shank 16 as shown in FIG. 2 is longitudinally movable relative to the housing 26 and the anti-friction bearings to permit braking engagement of the cap member 28 of the housing 26 with the braking means 22 under excessive longitudinally directed load conditions. However, the braking surfaces of the swivel elements are normally urged apart by resilient means 36 located between the shank 16 and the housing 26. As shown, such resilient means 36 are preferably in the form of one or more pairs of oppositely inclined Belleville washers. The inner and lower edge of the lower washer 38 of the assembly bears against the nut 40 secured on the lower end of shank 16, whereas the inner and upper edge of the upper washer 42 of the assembly bears against the inner race member 31 of the lowermost anti-friction bearing. The outer edges of the washers 38 and 42 are in contact with each other and normally tend to urge the shank 16 downward while urging the bearings and the housing upward. In this way, the resilient means 36 normally tends to hold the braking means 22 and the inclined braking surface 30 of the housing cap in spaced relation. Nevertheless, upon the application of an excessive or predetermined load to the swivel, the shank 16 is movable longitudinally with respect to the housing 26 against the action of the resilient means to bring the braking means 22 on the inclined surface 20 of the shank into braking engagement with the braking surface 30 on the inwardly extending cap member 28 of the housing.

The amount of tension or load necessary to cause such braking engagement to occur can be varied and predetermined by rotation of the cap 28 on the threaded upper end of the housing 26, whereas the adjustment then established may be maintained by means of the set screw 44.

In using the braking swivel described in an auto-rotating parachute assembly, the shroud lines 4 of the parachute 2 are attached to the fitting 6 carried by the shank 16 of the swivel, whereas the load 14 is attached to the fitting 12 carried by the swivel housing 26. Prior to use, the parachute, shroud lines and swivel are packed in a parachute pack or in an enclosure in which the assembly is housed preparatory to use. In packing the parachute, the shroud lines between the canopy and swivel are twisted a number of times in the direction in which the parachute is designed to rotate.

When the parachute is to be used, it is drawn from its pack or enclosure by means of a pilot chute 46 so that the canopy and shroud lines are extended but unopened as they draw the swivel into a load receiving position as shown in FIG. 3. Deceleration of the parachute and load takes place at once and the elements of the swivel are moved into their braking positions against the action of the resilient means 36. The direct contact thus established between the relatively rotatable elements of the swivel under high load conditions not only prevents rotation of the elements but causes the load to be transmitted directly from the fitting 6 to the fitting 12 through the cap member 28 and the housing 26. The load is not transmitted to the anti-friction bearing elements and the bearings are thus protected against damage due to excessive load conditions.

The twists in the shroud lines serve to delay the opening and rotation of the parachute canopy until the assembly has had an opportunity to be fully extended to its operative position and has decelerated to a safe speed or until the load applied to the swivel has been reduced. After this delay period, the shroud lines untwist allowing the canopy to expand slowly so that when fully deployed the shock loading of the shroud lines and swivel will not be excessive or adversely applied. The resilient means 36 then serves to move the braking means 22 on shank 16 away from the braking surface 30 on the housing cap member 28 whereupon the parachute is free to rotate in its normal manner during descent without applying an appreciable torque to the load or causing it to rotate. The parachute and its load, therefore, descend slowly and in the normal manner characteristic of auto-rotating parachutes.

The construction of the swivel shown in FIG. 2 embodies braking means and braking surfaces which are inclined with respect to the longitudinal direction of movement of the shank 16 and housing 26. This arrangement is preferred in some instances and particularly when the assembly will be subjected to very high tension. It is then possible to increase the area of the braking surfaces and to obtain some wedging action therebetween without materially increasing the diameter, size and weight of the swivel.

As shown in FIG. 4, a somewhat simpler and more economical form of swivel assembly may be provided and is satisfactory in most uses of the swivel. In this construction, the housing 50 of the swivel is provided with a cap member 52 which presents a shoulder 54 that extends radially inward over the radial flange 56 carried by the shank 58 of the swivel. The construction and operation of the remaining elements of the assembly may be the same or similar to those described above in connection with the swivel of FIG. 2. Longitudinal movement of the housing 50 relative to the shank 58 will cause the cap 52 to engage radial flange 56 so as to apply a braking action and direct loading of the rotatable elements of the swivel when the assembly is under excessive load. The anti-friction elements are protected against damage whereas free rotation of the elements is assured when the loading of the swivel is reduced.

Figure 5:
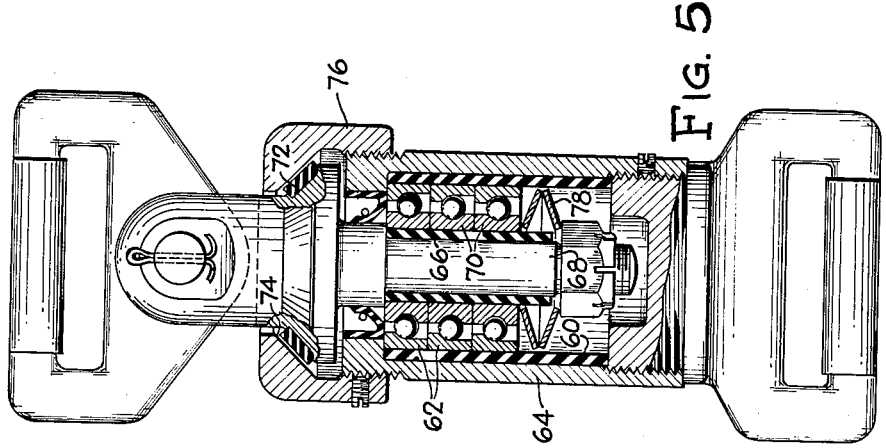
FIG. 5 is a longitudinal sectional view through a further alternative embodiment of the present invention.

While the resilient means embodied in the constructions shown in FIGS. 2, 4 and 5 are in the form of Belleville washers, it will be apparent that other forms or types of resilient means may be employed. Similarly, it is possible to use spring or other yieldable means to permit transverse movement of the elements. It is also possible to use other types of anti-friction means between the relatively rotatable elements of the swivel if desired.

In some instances and under some conditions of use, the swivel may be subjected to severe laterally directed forces. If the elements of the swivel are free to rotate when so stressed, the bearings may be damaged or the other elements of the assembly may be distorted or injured.

In order to overcome this danger, the construction of the present invention may be designed to apply a braking action to the swivel when it is subjected to excessive laterally directed forces. Thus, as shown in FIG. 5, yieldable means such as a sleeve 60 formed of relatively dense or hardened rubber or the like may be located between the outer race members 62 and the housing 64 of the swivel. In the alternative or in addition to the sleeve 60, a yieldable sleeve 66 may be located between the shank 68 of the swivel and the inner race members 70 of the bearing assembly.

With such constructions, the shank 68 is capable of sufficient movement transversely relative to the housing 64 to cause the braking surface 72 on the shank to engage the complementary braking surface 74 on the cap 76 carried by the housing. Therefore, upon application of severe transversely directed forces tending to tilt the shank or displace it laterally with respect to the housing 64, the race members are forced against one or both of the yieldable sleeves 60 and 66 causing them to be compressed so that the braking surfaces on the shank and housing cap are brought into braking engagement.

As shown in FIG. 5, the shank and housing also may be movable longitudinally against the action of the yieldable means 78. The desired braking action, therefore, will be applied to the elements when the swivel is subjected to either longitudinal or transverse forces or to diagonally directed forces or any adverse combination of longitudinally and transversely directed forces.

In the alternative embodiment of the invention illustrated in FIG. 6, the elements of the swivel may be generally similar to those of FIG. 2 and FIG. 5. However, the shank 80 of the swivel extends a substantial distance above the anti-friction elements 82 and is capable of sufficient lateral bending or flexing to bring the braking element 84 on the head 86 of the shank into frictional engagement with the inclined braking surface 88 on the cap 90 carried by the sleeve 92 of the swivel.

With this construction it is, of course, possible to employ yieldable means such as the Belleville washers of the swivels of FIGS. 2, 4 and 5. However, as shown in FIG. 6, such yieldable means may be eliminated. The anti-friction elements are then held fixedly in place by means of a shoulder or element 94 on the shank 80 and a retaining member 96 secured to the lower end of the shank. Lateral flexing of the unsupported portion of the shank above the anti-friction elements as shown in dotted lines in FIG. 6 will then take place upon the application of transversely directed forces to the swivel. In this way, a braking action will be produced and continue until the adverse force has been dissipated or relieved.

While the invention has been illustrated and described as applied to parachutes designed to support a load during descent, the parachute assembly is adapted for use with droque chutes, brake chutes for aircraft and other flying equipment as well, and in fact, has one of its most important applications in retarding high speed aircraft during landing operations. The swivel of the present invention

I claim:

1. A swivel comprising a shank having means thereon for securing a rotatable member thereto, a housing surrounding said shank and having means thereon for securing a load thereto, antifriction means positioned between said shank and housing and serving to reduce the frictional resistance to relative rotation thereof, and load responsive means interposed between said shank and housing, said shank being longitudinally movable with respect to the housing and said anti-friction means against the action of said load responsive means to increase the frictional resistance to relative rotation of the shank and housing upon application of a predetermined load thereto.

2. A swivel comprising a shank having means thereon for securing a rotatable member thereto, said shank having a radially extending braking surface thereon, a housing surrounding said shank and having a braking surface thereon complementary to the radially extending braking surface on the shank, antifriction means between said shank and housing, and resilient means between said shank and housing normally urging said braking surfaces apart but yieldable under predetermined load to permit longitudinal movement of said shank with respect to said housing and anti-friction means to a position wherein said braking surfaces are brought into engagement.

3. A swivel comprising a shank having means thereon for securing a rotatable member thereto, said shank having a radially inclined braking surface thereon, a housing surrounding the shank and having means thereon for securing a load thereto, said housing having a member adjustably mounted thereon and presenting a braking surface complementary to the braking surface on the shank, said shank and housing being relatively movable in a longitudinal direction to bring said braking surfaces into engagement, antifriction means between said shank and housing, and resilient means normally urging said braking surfaces apart but yieldable under load to permit longitudinal movement of said shank with respect to said housing and antifriction means to a position wherein said braking surfaces are brought into engagement.

4. An auto-rotating parachute having a canopy and shroud lines, a swivel including a member to which said shroud lines are connected and a second member to which a load may be secured, said members being relatively rotatable, and means interposed between said members and responsive to the load applied thereto for retarding relative rotation thereof.

5. An auto-rotating parachute having a canopy and shroud lines, a swivel including a member to which said shroud lines are secured and a second member to which a load may be secured, said members being relatively rotatable and longitudinally movable with respect to each other, complementary braking surfaces on said members engageable on relative longitudinal movement thereof, and resilient means interposed between said members normally urging said braking surfaces apart but yieldable under predetermined load to permit engagement of said braking surfaces.

6. An auto-rotating parachute having a canopy and shroud lines, a swivel having a member to which said shroud lines are connected, a second member to which a load may be attached and antifriction means between said members, said members having complementary braking surfaces thereon movable into and out of contact, and resilient means interposed between said members and normally urging the braking surfaces thereon apart but yieldable under a predetermined load to permit movement of said braking surfaces into frictional engagement.

7. The method of packing an auto-rotating parachute which has shroud lines connected to a swivel which comprises twisting the shroud lines between the parachute and swivel and stowing the assembly in a container therefor.

8. A swivel comprising relatively rotatable elements having complemental load transmitting surfaces, antifriction means between the elements, means urging the surfaces apart so that normal loads are imposed through the anti-friction means to facilitate relative rotation of the elements and abnormal loads force said surfaces together preventing injury to said anti-friction means.

9. In combination with an auto-rotating parachute and a load to be suspended therefrom, a swivel having two relatively rotatable parts one of which is connected to said parachute and the other of which is connected to said load, and means carried by the swivel and movable in response to the application of predetermined forces to said relatively rotatable parts for retarding relative rotation thereof.

10. In combination with an auto-rotating parachute and a load to be suspended therefrom, a swivel having two relatively rotatable parts one of which is connected to said parachute and the other of which is connected to said load, and braking surfaces carried by the relatively rotatable parts of the swivel, means normally urging said braking surfaces apart but yieldable under a predetermined force applied to said relatively rotatable parts of the swivel to permit engagement of said braking surfaces to retard rotation of the parachute.

11. In combination with an auto-rotating parachute and a load to be suspended therefrom, a swivel having two relatively rotatable parts one of which is connected to said parachute and the other of which is connected to said load, and means for delaying initial rotation of said parachute upon deployment thereof including means carried by said swivel and yieldable upon the application of a predetermined force to said swivel to oppose rotation of said parachute.

12. In combination with an auto-rotating parachute having a canopy designed to rotate in a predetermined direction, a swivel to which a load may be attached, shroud lines connected to said canopy and swivel, and an enclosure for the parachute, said canopy and shroud lines being packed within said enclosure with the shroud lines twisted a plurality of times in the direction in which the parachute canopy is designed to rotate.

13. In combination with an auto-rotating parachute having a canopy designed to rotate in a predetermined direction, a swivel having two relatively rotatable parts one of which is provided with means for attachment of a load thereto, shroud lines connected to the other of said rotatable parts and to said parachute canopy, an enclosure for said parachute, said parachute canopy and shroud lines being packed within said enclosure with the shroud lines twisted a plurality of times in the direction in which the parachute is designed to rotate, and means carried by said swivel and responsive to the tension applied thereto upon deployment of the parachute for retarding relative rotation of said parts until said shroud lines have become untwisted.

14. A swivel having two relatively rotatable parts, antifriction means positioned between said parts and serving to reduce resistance to relative rotation thereof one of which said relatively rotatable parts being movable axially of said swivel and with respect to the other rotatable part and with respect to said anti-friction means, and braking elements carried by said relatively rotatable parts and positioned to be brought into braking engagement upon relative longitudinal movement of said relatively rotatable parts.

15. A swivel having a shank and a housing, said shank and housing being relatively rotatable about a common axis, anti-friction means interposed between the shank and housing and including an inner race member rotatable with said shank, an outer race member rotatable with said housing, and rotatable bearings located between and engaging said inner and outer race members, complementary braking elements carried by the shank and housing, and yieldable means urging said braking elements apart in a direction axially of said swivel, said shank being axially movable with respect to said housing and said inner race member and against the action of said yieldable means to a position in which said braking elements are in frictional engagement.

References Cited in the file of this patent

UNITED STATES PATENTS

| | | |
|---|---|---|
| 620,902 | Fabe | Mar. 14, 1899 |
| 1,408,955 | Lopez | Mar. 7, 1922 |
| 2,663,525 | Smith | Dec. 22, 1953 |
| 2,701,697 | Ewing | Feb. 8, 1955 |
| 2,724,567 | Adams | Nov. 22, 1955 |
| 2,772,902 | Lind | Dec. 4, 1956 |
| 2,775,137 | Jackson | Dec. 25, 1956 |
| 2,811,378 | Kalista | Oct. 29, 1957 |
| 2,936,138 | Stencel | May 10, 1960 |
| 2,949,266 | Sepp | Aug. 16, 1960 |